United States Patent [19]

Conti

[11] 4,084,242
[45] Apr. 11, 1978

[54] ELECTRONIC POSTAGE WEIGHING SCALE

[75] Inventor: Joseph A. Conti, Whitestone, N.Y.

[73] Assignee: Pitney-Bowes, Inc., Stamford, Conn.

[21] Appl. No.: 740,431

[22] Filed: Nov. 10, 1976

[51] Int. Cl.² ..................... G01G 23/22; G06F 9/14
[52] U.S. Cl. ..................... 364/466; 177/25;
177/DIG. 6; 364/708; 364/712
[58] Field of Search .................. 235/151.33, 152, 156;
177/25, DIG. 6

[56] References Cited

U.S. PATENT DOCUMENTS

| | | | |
|---|---|---|---|
| 3,635,297 | 1/1972 | Salava | 235/151.33 |
| 3,951,221 | 4/1976 | Rock | 177/25 |
| 3,978,328 | 8/1976 | Fabry et al. | 235/156 |
| 4,002,892 | 1/1977 | Zielinski | 235/156 |
| 4,017,725 | 4/1977 | Roen | 235/152 |

*Primary Examiner*—Felix D. Gruber
*Attorney, Agent, or Firm*—Robert S. Salzman; William D. Soltow, Jr.; Albert W. Scribner

[57] ABSTRACT

An electronic weighing scale for determining the postage value of weighed articles. The scale features easily accessible electronics for a postal rate table in stored memory. Because the postal rates on packages change with a fair amount of periodicity, the stored memory electronics containing the postal rates require frequent replacement. This replacement is accomplished easily by means of the invention. The stored memory is on an easily removable chip disposed on an IC board. The IC board is secured to a pull-out draw on a side of the scale housing.

5 Claims, 3 Drawing Figures

ELECTRONIC POSTAGE WEIGHING SCALE

The invention relates to postal equipment and more particularly to an electronic weighing scale for determining the postage of weighed articles.

BACKGROUND OF THE INVENTION

Heretofore, many electronic postal scales have been designed to compute the postage of weighed articles, taking into account such factors as destination, zone, class, insurance, etc. Such scales are shown in the patents to:

R. F. Salava, U.S. Pat. No. 3,635,297, Issued: Jan. 18, 1972; and

F. C. Rock, U.S. Pat. No. 3,951,221, Issued: Apr. 20, 1976.

One of the major problems with electronic scales is caused by frequent postal rate changes, which require a redesign and/or change of electronic componentry.

In recent years, these changes have become so frequent (once a month), that a need has arisen for a way to modify these scales both quickly and easily. The problem is not easily overcome, because most of the scales needing modification are in the hands of private users, who cannot be bothered to make the necessary adjustments. Neither is it economically feasible to maintain a servicing organization to make the necessary adjustment, because the changes are too frequent. Clearly, the only solution is for the scale to be designed in such a manner, that the required adjustments can be easily made by unskilled presonnel. In this way, the users will have no objection to purchasing these scales, because future use will not be marred by the burdensome chore of difficult maintanence.

The invention addresses itself to the aforementioned problem. The invention provides a postal scale design which is easily and quickly modifiable by unskilled personnel, in response to changes necessitated by frequent rate changes.

SUMMARY OF THE INVENTION

The invention pertains to an electronic postal weighing scale. The scale has electronics for determining a postage value for an article or package being weighed. The electronics are supported within a pull-out draw, which is mounted in a side wall of the scale housing. When a weighing pan, disposed upon said housing receives an article to be weighed, a transducer becomes operative to provide signals to the electronics. The electronics contain a IC circuit chip containing postage rate information. The IC chip is an easily removable PROM, (programmable read only memory) that is pin connected to a circuit board in the draw. Thus, when postage rates change, a user can quickly and easily change the electronics to accept new postal information. All that is required, is to pull out the draw from the housing and lift out the obsolete PROM. Next, a new PROM with updated postal rates is substituted in place of the old PROM. The draw is pushed in to lie flush with the housing, and the scale is now ready to perform computations based upon the new postal rates. The manufacturer of these scales can now mail, or otherwise send a new PROM to each user for every change in the rates. This eliminates the need for a costly servicing procedure. The user can easily perform the required change without special training, tools, or knowledge of the electronics.

It is an object of the invention to provide an improved electronic postage scale;

It is another object of this invention to provide a means for quickly updating the electronics of an electronic postage scale;

It is a further object of the invention to provide an electronic postal scale, whose postal rate information is easily and quickly updated by the user without special tools and training.

These and other objects of this invention will be better understood and will become more apparent with reference to the following detailed description taken in conjunction with the accompanying drawings, in which.

DETAILED DESCRIPTION

Figure 1:
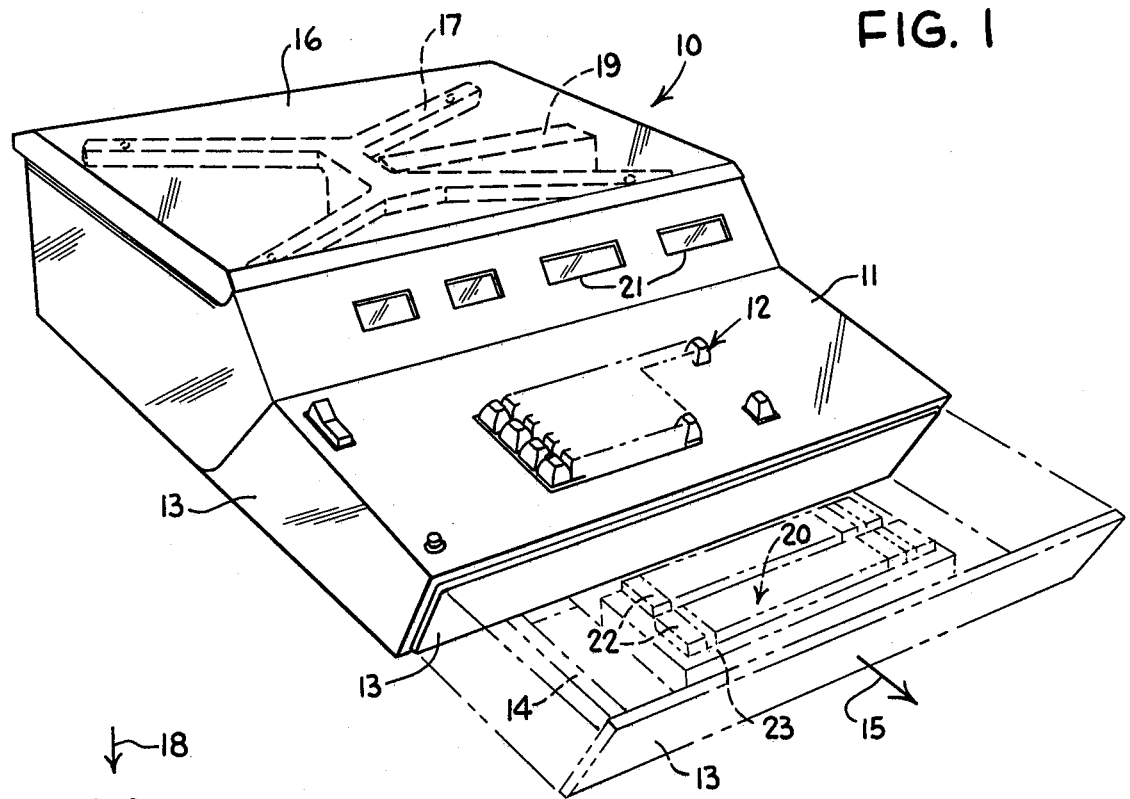
FIG. 1 is a perspective view of a typical electronic postage scale illustrating the invention.

Now referring to FIG. 1 an electronic postal scale is illustrated generally by arrow 10. The scale 10 has a front panel 11 containing a keyboard 12 for introducing postal information into the scale, such as destination or insurance data. The scale 10 has a housing comprising four side walls 13 (only two shown). The front or forward side wall 13 forms part of a "pull-out" or slidable draw 14, which can be made to extend (arrow 15) from the housing as shown in phantom, and as also depicted in FIG. 3.

Figure 2:
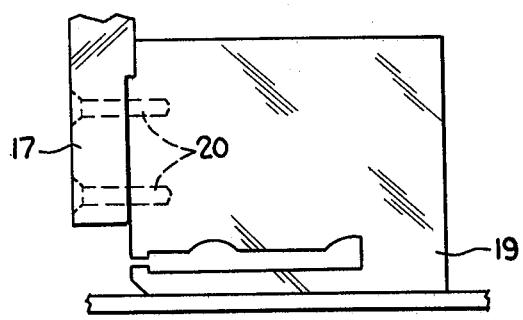
FIG. 2 is a partial side view of a pan and transducer connection for the scale of FIG. 1.

The top of the scale 10 is covered by a weighing pan 16, which is movably supported by an underlying crossmember 17 illustrated in phantom. When the pan 16 is caused to deflect downwardly, as when a package (not shown) is placed upon it, the support 17 (see FIG. 2) also moves downwardly as shown by arrow 18.

The support 17 is connected to a transducer 19 (FIGS. 1 and 2) by suitable means, such as screws 20. The transducer 19 may be a load cell or a moire (optical) detector, etc. With a load cell, the pan deflection will be very small over the entire weighing range being considered. A typical weighing range may be 0–70 pounds, and a typical deflection by a load cell may be 0.020 inches over this range.

Figure 3:
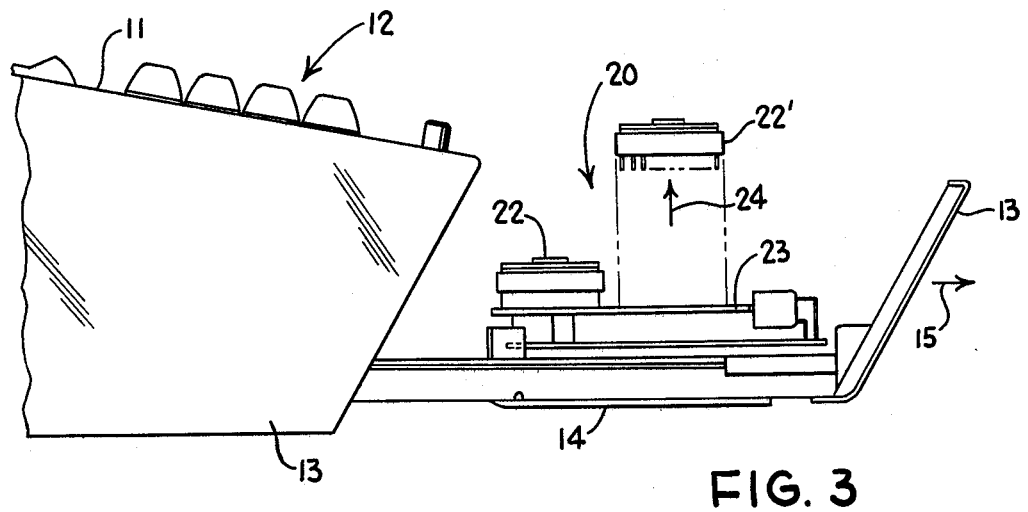
FIG. 3 is a side view of FIG. 1 depicting the removal of a PROM containing postage rate information.

The transducer 19 is connected to and transmits a signal to the scale electronics shown generally by arrow 20 in FIGS. 1 and 3. The scale electronics 20 processes the weight information from the transducer 19, and the inputted information from the keyboard 12, in order to calculate the proper postage value for the package or article being weighed. This value can be displayed (or printed out) in a display window 21 on the front panel 11 as illustrated.

The electronics 20 for the scale can comprise several IC circuit chips 22. These chips 22 are pin connected to a circuit board 23, making their removal or substitution very easy.

One of these IC chips is a PROM (programmable read only memory) containing stored postal rate information as depicted by designation 22' in FIG. 3.

When new postal rates come into effect, the user of the scale 10 is mailed or supplied with a new or updated chip 22'. The user pulls out (arrow 15) draw 14 from the housing 13. The user, then removes (arrow 24) the old outdated chip 22' from board 23.

The new chip 22' is substituted in place of the old chip by pressing its pins into board 23 (not shown). The draw 14 is then pushed back into the housing 10.

Having thus described the invention, it will be evident that the stated objectives have been met, and the aforementioned problem of scale servicing has been resolved.

Having described the invention, what is desired to be protected by Letters Patent is presented in the appended claims.

What is claimed is:

1. An electronic postal weighing scale, comprising:

a housing having a number of walls and containing postage electronics for determining a postage value for an article to be weighed;

a weighing pan disposed upon said housing and movable through a weighing range in response to the deposit of an article thereon;

a display connected to the postage electronics for displaying a computed postage value for the article being weighed;

a weighing transducer operatively connected to said pan and said electronics, said transducer responsive to the movement of the pan to provide weighing signals to the electronics for computation of a postage value for said weighing article; and a slidably movable draw slidably mounted upon one of said side walls of said housing, said draw supporting an array of electronic components for the computation of said postage value for said article to be weighed, said draw being slidable from its side wall to afford easy access to said electronics, said array of electronic components including an IC board containing a removable PROM component containing postage rate information, said PROM being removable for ease of changing said PROM.

2. The electronic postal weighing scale of claim 1, wherein said array of electronic components includes a removable IC circuit chip containing storage means for postal rate information, said chip being removable for ease of changing said chip.

3. The electronic postal weighing scale of claim 1, further comprising a keyboard disposed upon said housing and operatively connected to said postage electronics for supplying postal destination information to the electronics for computing the postage value.

4. The electronic postal weighing scale of claim 1, wherein said weighing transducer is a load cell.

5. The electronic postal weighing scale of claim 1, wherein said weighing transducer is a moire fringe generating apparatus.

* * * * *